United States Patent
Huang et al.

(10) Patent No.: US 6,836,410 B1
(45) Date of Patent: Dec. 28, 2004

(54) COMPUTER APPARATUS MOUNTING STRUCTURE

(75) Inventors: Yeong-Chyi Huang, Taipei (TW); Fu-Jung Hsui, Taipei (TW); Pi-Yun Lee, Taipei (TW)

(73) Assignee: Tatung Co., Ltd, Taipei (TW)

( * ) Notice: Subject to any disclaimer, the term of this patent is extended or adjusted under 35 U.S.C. 154(b) by 0 days.

(21) Appl. No.: 10/788,386

(22) Filed: Mar. 1, 2004

(30) Foreign Application Priority Data

Nov. 14, 2003 (CN) ........................................ 92220225 U

(51) Int. Cl.$^7$ ................................................ H05K 7/16
(52) U.S. Cl. ..................... 361/726; 361/727; 312/223.2
(58) Field of Search ............................... 361/683, 685, 361/724–727; 312/223.1, 223.2, 332.1, 333; 360/98.01, 137; 369/75.11, 82

(56) References Cited

U.S. PATENT DOCUMENTS

| | | | |
|---|---|---|---|
| 4,125,305 A | * | 11/1978 | Kasindorf ................ 312/332.1 |
| 5,767,445 A | * | 6/1998 | Wu ............................ 174/52.1 |
| 5,947,571 A | * | 9/1999 | Ho ............................ 312/265.6 |
| 6,337,793 B1 | * | 1/2002 | Vier et al. .................. 361/683 |
| 2003/0081379 A1 | * | 5/2003 | Chen .......................... 361/685 |
| 2004/0114320 A1 | * | 6/2004 | Williams et al. ............ 361/685 |

* cited by examiner

*Primary Examiner*—Lynn Feild
*Assistant Examiner*—Corey Broussard
(74) *Attorney, Agent, or Firm*—Bacon & Thomas PLLC

(57) ABSTRACT

A computer apparatus mounting structure is constructed to include a mounting frame having a front stop portion, a computer apparatus inserted into the inside of the mounting frame, the computer apparatus having a stop flange, which is stopped against the front stop portion of the mounting frame to hold the computer apparatus in position, and a locking member coupled to the mounting frame and adapted to insert into locating holes in one side of the computer apparatus to hold the computer apparatus inside the mounting frame. The computer apparatus is a standard 5¼" computer apparatus with the location and size of the locating holes made subject to the 5¼" computer apparatus standards for quick installation.

6 Claims, 5 Drawing Sheets

COMPUTER APPARATUS MOUNTING STRUCTURE

BACKGROUND OF THE INVENTION

1. Field of the Invention

The present invention relates to a computer apparatus mounting structure and, more particularly to such a computer apparatus mounting structure suitable for the installation of any of a variety of 5¼" computer apparatus including CD-ROM, CD-RW, etc.

2. Description of Related Art

Among computer apparatus, 5¼" computer apparatus is the most popularly used standard. For example, CD-ROM and CD-RW adopt 5¼" design.

Conventionally, screws are used to fix a 5¼" computer apparatus to the inside of the case of a computer. During installation, the 5¼" computer apparatus is affixed to the inside of a mounting frame with screws, and then the mounting frame is mounted inside the computer.

However, it is complicated to fasten a 5¼" computer apparatus to a mounting frame. FIG. 1 shows another conventional 5¼" computer apparatus mounting design. As illustrated, the 5¼" computer apparatus 9 comprises a sliding rail 91 at each of the two opposite lateral sides, and a track assembly (not shown) is provided in a rack inside the computer for receiving the sliding rails 91 of the 5¼" computer apparatus 9. The 5¼" computer apparatus 9 further comprises a retaining device 92 at each sliding rail 91. After insertion of the 5¼" computer apparatus 9 into the rack inside the computer, the retaining device 92 automatically locks the 5¼" computer apparatus 9 to the rack.

This computer apparatus mounting design is still not perfect. Because the sliding rails 91 must be separately made and then fastened to the computer apparatus, the mounting time and cost of the computer apparatus are relatively increased.

SUMMARY OF THE INVENTION

The present invention has been accomplished under the circumstances in view. It is therefore the main object of the present invention to provide a computer apparatus mounting structure, which reduces the number of parts and simplifies the mounting procedure, thereby saving much installation time and cost.

To achieve this and other objects of the present invention, the computer apparatus mounting structure is comprised of a mounting frame, a computer apparatus, and a locking member. The mounting frame comprises an upper panel, a left-side panel, a right-side panel, a receiving open chamber surrounded by the upper panel, the left-side panel and the right-side panel. The upper panel has a front side terminating in a stop portion. The right-side panel has at least one through hole and an outwardly extended transverse flange disposed adjacent to the upper panel. The transverse flange has an elongated slot.

The computer apparatus is inserted from the front side of the mounting frame into the inside of the receiving open chamber. The computer apparatus has a top wall, a left-side wall, and a right-side wall respectively disposed corresponding to the upper panel, left-side panel and right-side panel of the mounting frame. The top wall of the computer apparatus has a front stop flange stopped at the stop portion of the upper panel of the mounting frame. The right-side wall of the computer apparatus has at least one locating holes corresponding to the at least one through hole of the right-side panel of the mounting frame. The locking member comprises a transverse plate, and a longitudinal plate, wherein the transverse plate supported on the transverse flange of the right-side wall of the right-side panel of the mounting frame and movable along the transverse flange toward the right-side panel of the mounting frame, and the longitudinal plate downwardly extended from the transverse plate and inserted through the elongated slot of the transverse flange. The longitudinal plate has at least one locating rod perpendicularly extended from one side thereof and adapted to pass through the at least one through hole in the right-side panel of the mounting frame and to insert into the at least one locating hole in the right-side wall of the computer apparatus to bold the computer apparatus inside the mounting frame.

Because the computer apparatus is not mounted with any external members, the outer appearance of the computer apparatus is maintained intact, and no any additional processing or installation procedure is required. Therefore, the invention saves much installation time and cost.

Further, the aforesaid computer apparatus can be a standard 5¼" computer apparatus. Because a standard 5¼" computer apparatus has standard specifications, the aforesaid computer apparatus mounting structure fits computer apparatus of different models from different suppliers for quick installation. When inserted the computer apparatus into the receiving open chamber of the mounting frame, the stop flange of the computer apparatus is directly stopped at the stop portion of the upper panel of the mounting frame to keep the locating holes in alignment with the through holes in the right-side panel of the mounting frame respectively.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
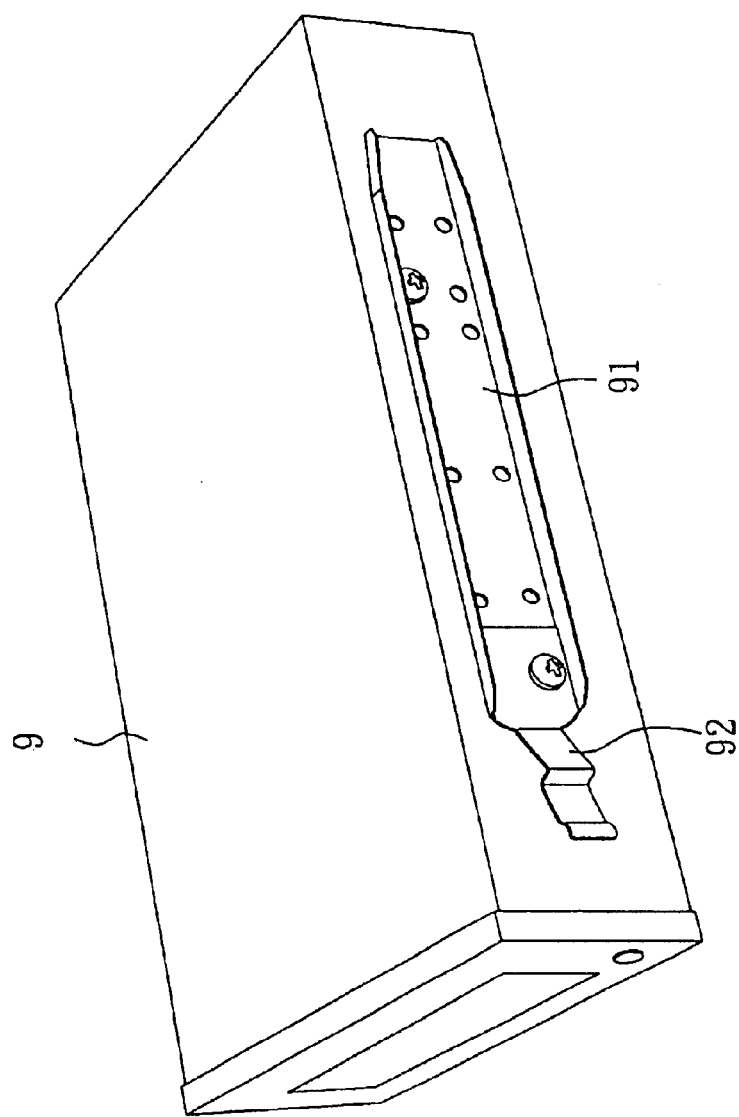
FIG. 1 is an elevational view of a conventional 5¼" computer apparatus.
Figure 2:
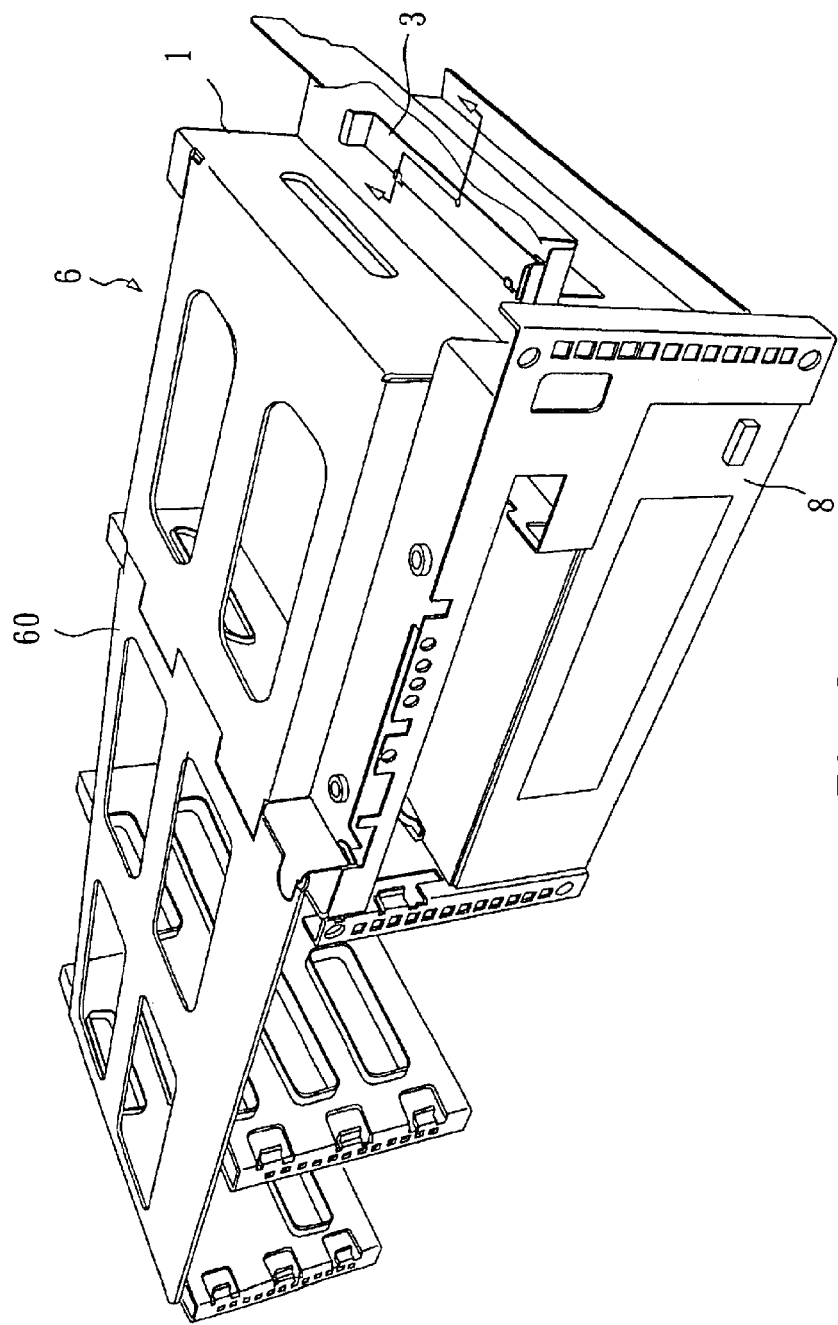
FIG. 2 is a schematic drawing showing a computer apparatus mounting structure mounted in a rack according to the present invention.

Referring to FIG. 2, a computer apparatus mounting structure 6 is shown mounted in a rack 60 inside a computer (not shown).

Figure 3:
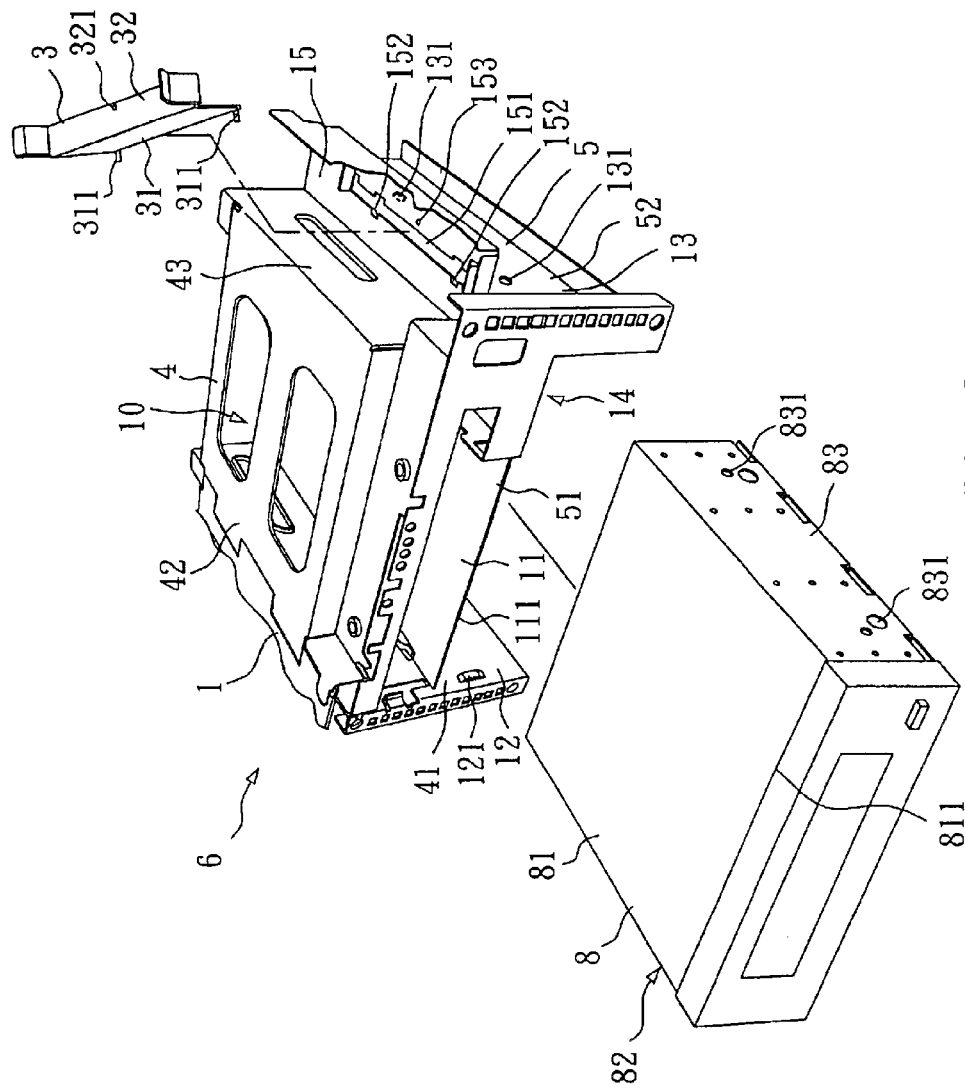
FIG. 3 is an exploded view of the computer apparatus mounting structure according to the present invention.
Figure 4:
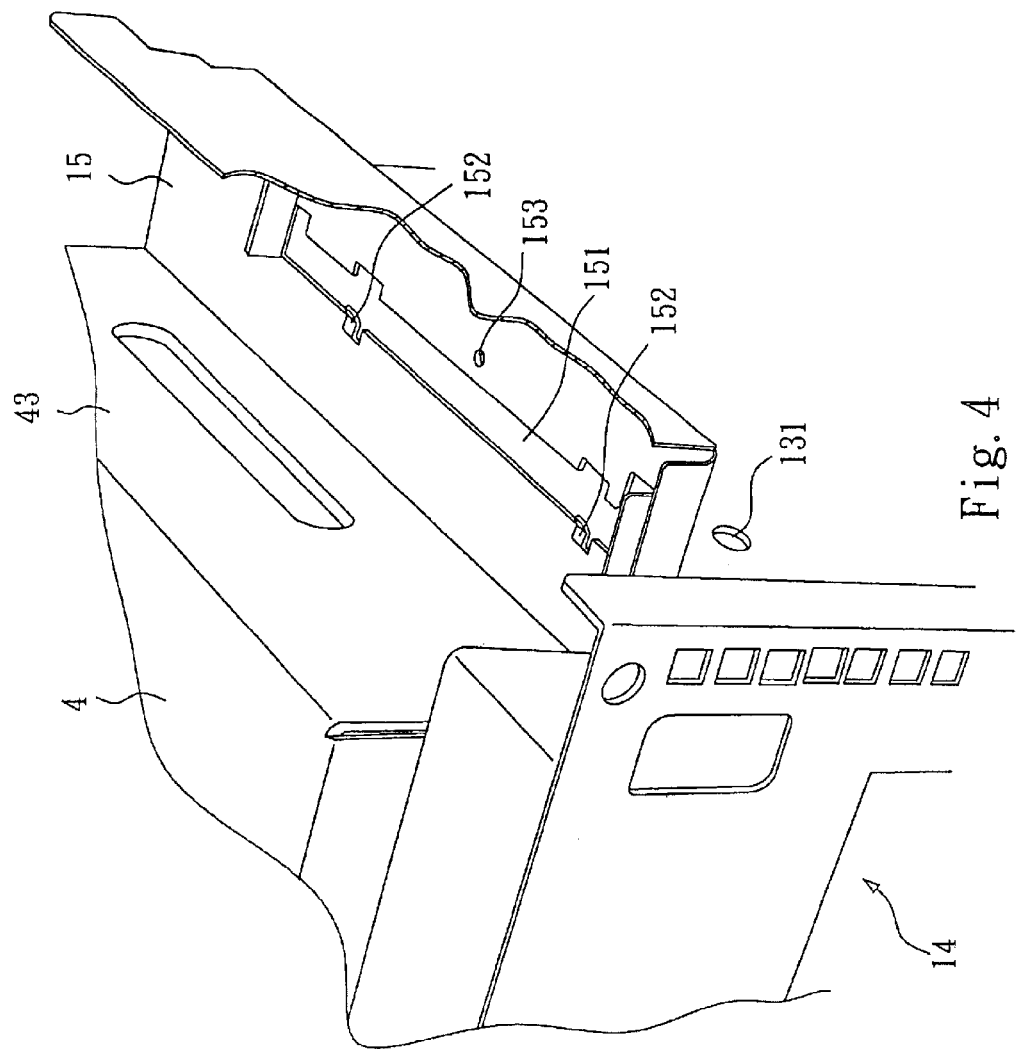
FIG. 4 is an enlarged view of a part of FIG. 3.

Referring to FIGS. 3 and 4, and FIG. 2 again, the computer apparatus mounting structure 6 is comprised of a mounting frame 1, a computer apparatus 8, and a locking member 3. The mounting frame 1 is comprised of an upper frame base 4 and a bottom frame base 5 arranged in a stack. The upper frame base 4 comprises a left-side wall 41, a top wall 42, and a right-side wall 43. The bottom frame base 5 comprises a top wall 51, and a downwardly extended right-side wall 52. The left-side wall 41 of the upper frame base 4 forms a left-side panel 12 of the mounting frame 1. The top wall 51 of the bottom frame base 5 forms an upper panel 11 of the mounting frame 1. The right-side wall 43 of the upper frame base 4 and the right-side wall 52 of the bottom frame base 5 are attached together, forming a right-side panel 13 of the mounting frame 1.

In the aforesaid mounting frame 1, the upper panel 11, the left-side panel 12 and the right-side panel 13 define a receiving open chamber 14. The upper panel 11 has a front part forming a stop portion 111. The left-side panel 12 has a plurality of raised portions 121. The right-side wall 52 of the right-side panel 13 has two through holes 131 transversely aligned in a line. The right-side wall 43 of the right-side panel 13 has a transverse flange 15 disposed adjacent to the upper panel 11. The transverse flange 15 comprises an elongated slot 151, two springy retaining strips 152, and a mounting hole 153.

The aforesaid computer apparatus 8 is a 5¼" computer apparatus, for example, a CD-ROM player, having a top wall 81, a left-side wall 82, and a right-side wall 83 respectively disposed corresponding to the upper panel 11, left-side panel 12 and right-side panel 13 of the mounting frame 1. The top wall 81 has a front stop flange 811. The right-side wall 83 has a plurality of locating holes 831 transversely aligned in a line. The side locating holes of regular standard 5¼" computer apparatus are standardized, i.e., the locations and size of the locating holes are determined subject to the standards for 5¼" computer apparatus. The through holes 131 of the aforesaid mounting frame 1 are also made subject to the standards for 5¼" computer apparatus. Therefore, two of the locating holes 831 of the right-side wall 83 of the computer apparatus 8 are adapted to align with the through holes 131 in the right-side panel 13 of the mounting frame 1.

Further, the locking member 3 comprises a transverse plate 32 and a longitudinal plate 31. The transverse plate 32 is rested on the transverse flange 15 of the right-side wall 43 of the right-side panel 13 and movable along the transverse flange 15 toward the right-side panel 13 of the mounting frame 1, having a through hole 321. The longitudinal plate 31 extends downwardly from the transverse plate 32 and inserted through the elongated slot 151, having two locating rods 311 perpendicularly extended from one side thereof at same elevation and spaced from each other at a pitch subject to the aforesaid the standards for 5¼" computer apparatus.

Figure 5:
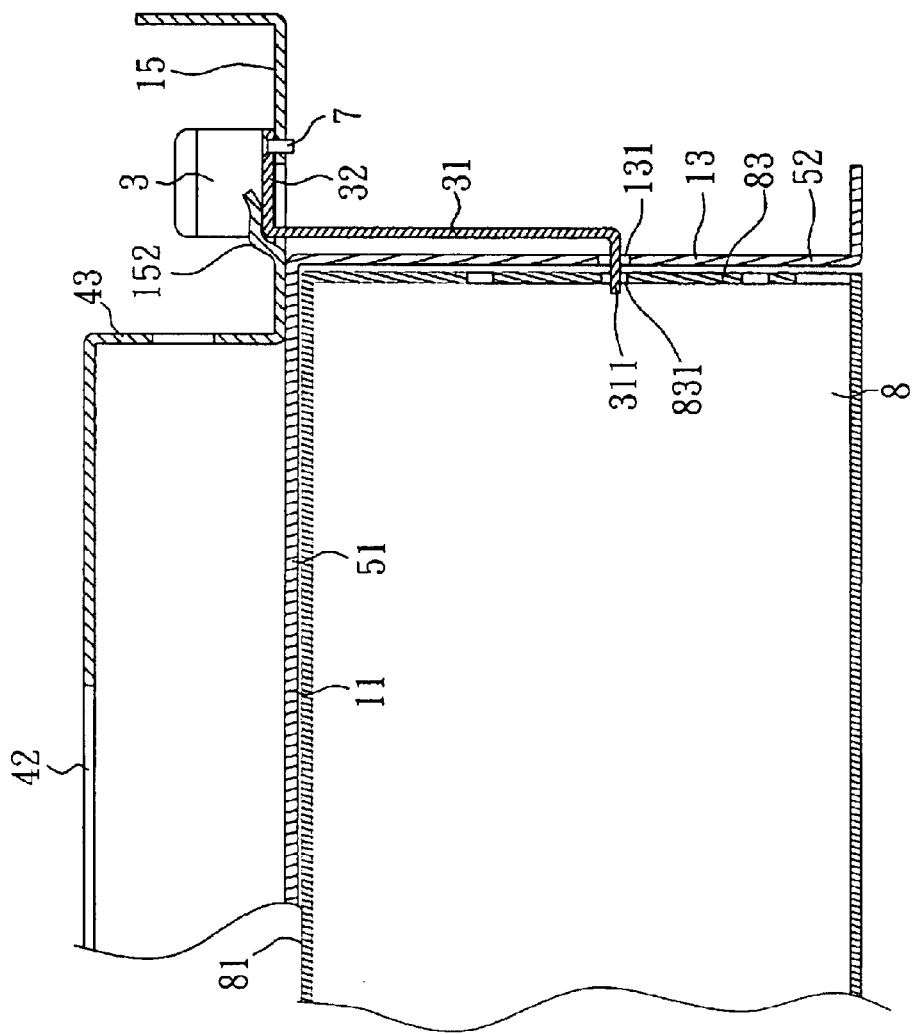
FIG. 5 is a sectional side view of the computer apparatus mounting structure according to the present invention.

Referring to FIG. 5 and FIGS. From 2 through 4 again, when inserted the computer apparatus 8 from the front side of the mounting frame 1 into the inside of the receiving open chamber 14 of the mounting frame 1, the stop flange 811 of the top wall 81 of the computer apparatus 8 is stopped at the stop portion 111 of the upper panel 11 of the mounting frame 1, and therefore the computer apparatus 8 is automatically positioned in position. At this time, the left-side wall 82 and right-side wall 83 of the computer apparatus 8 are respectively stopped against the raised portions 121 of the left-side panel 12 of the mounting frame 1 and disposed in contact with the right-side panel 13 of the mounting frame 1, and two of the locating holes 831 of the right-side wall 83 of the computer apparatus 8 are respectively aligned with the through holes 131 of the right-side panel 13 of the mounting frame 1. Therefore, the transverse plate 32 is moved with the locking member 3 toward the right-side panel 13 of the mounting frame 1 to force the locating rods 311 passing through the through holes 131 in the right-side panel 13 of the mounting frame 1 and inserted into the locating holes 831 in the right-side wall 83 of the computer apparatus 8.

As indicated above, when inserted the computer apparatus 8 into the receiving open chamber 14 of the mounting frame 1, the stop flange 811 of the computer apparatus 8 is directly stopped at the stop portion 111 of the upper panel 11 of the mounting frame 1 to keep the locating holes 831 in alignment with the through holes 131 in the right-side panel 13 of the mounting frame 1 respectively. Because a standard 5¼" computer apparatus has standard specifications, the aforesaid computer apparatus mounting structure fits computer apparatus of different models from different suppliers for quick installation.

Except the stop flange 811 at the top wall 81 of the computer apparatus 8, another stop flange may be formed on the right-side wall 83 of the computer apparatus 8, and the right-side panel 13 of the mounting frame 1 is made having a stop portion for stopping the stop flange at the right-side wall 83 of the computer apparatus 8 to hold the computer apparatus 8 in position.

Because the computer apparatus 8 is not mounted with any external members, the outer appearance of the computer apparatus 8 is maintained intact, and no any additional processing or installation procedure is required. Therefore, the invention saves much installation time and cost.

Further, after the transverse plate 32 of the locking member 3 has been moved to the right-side panel 13 of the mounting frame 1 and forced into engagement with the springy retaining strips 152 at the transverse flange 15 of the mounting frame 1, a screw 7 is fastened to the mounting hole 153 of the transverse flange 15 and the through hole 321 of the transverse plate 32 of the locking member 3 to fix the locking member 3 to the transverse flange 15.

Referring to FIG. 3 again, a second receiving open chamber 10 is defined between the top wall 42 of the upper frame base 4 and the top wall 51 of the bottom frame base 5 for accommodating another computer apparatus (not shown).

A prototype of computer apparatus mounting structure has been constructed with the features of FIGS. 1~5. The computer apparatus mounting structure functions smoothly to provide all of the features discussed earlier.

Although a particular embodiment of the present invention has been described in detail for purposes of illustration, various modifications and enhancements may be made without departing from the scope of the invention. Accordingly, the invention is not to be limited except as by the appended claims.

What is claimed is:

1. A computer apparatus mounting structure comprising:
   a mounting frame, said mounting frame comprising an upper panel, a left-side panel, a right-side panel, a receiving open chamber surrounded by said upper panel, said left-side panel and said right-side panel, said upper panel having a front side terminating in a stop portion, said right-side panel having at least one through hole and an outwardly extended transverse flange disposed adjacent to said upper panel, said transverse flange having an elongated slot;
   a computer apparatus inserted from a front side of said mounting frame into the inside of said receiving open chamber, said computer apparatus having a top wall, a left-side wall, and a right-side wall respectively disposed corresponding to the upper panel, left-side panel and right-side panel of said mounting frame, the top wall of said computer apparatus having a front stop flange stopped at the stop portion of the upper panel of said mounting frame, the right-side wall of said computer apparatus having at least one locating holes corresponding to the at least one through hole of the right-side panel of said mounting frame; and a locking member adapted to lock said computer apparatus to said mounting frame, said locking member comprising a transverse plate, and a longitudinal plate, wherein said transverse plate supported on said transverse flange of said right-side panel of said mounting frame and movable along said transverse flange toward said right-side panel of said mounting frame, said longitudinal plate downwardly extended from said transverse plate and inserted through said elongated slot of said transverse flange, said longitudinal plate having at least one locating rod perpendicularly extended from one side thereof and adapted to pass through the at least one through hole in said right-side panel of said mounting frame and to insert into the at least one locating hole in the right-side wall of said computer apparatus.

2. The computer apparatus mounting structure as claimed in claim 1, wherein said mounting frame is comprised of an upper frame base and a bottom frame base arranged in a stack, said upper frame base comprising a left-side wall, a top wall, and a right-side wall, said bottom frame base comprising a top wall and a downwardly extended right-side wall, the left-side wall of said upper frame base forming the left-side panel of said mounting frame, the top wall of said bottom frame base forming the upper panel of said mounting frame, the right-side wall of said upper frame base and the right-side wall of said bottom frame base being attached together to form the right-side panel of said mounting frame, the at least one through hole of said mounting frame being formed in the downwardly extended right-side wall of said bottom base frame, said transverse flange being formed on the right-side wall of said upper frame base.

3. The computer apparatus mounting structure as claimed in claim 2, wherein said mounting frame further comprises a second receiving open chamber defined between the top wall of said upper frame base and the top wall of said bottom frame base.

4. The computer apparatus mounting structure as claimed in claim 1, wherein said transverse flange comprises at least one springy retaining strip adapted to engage the transverse plate of said locking member upon movement of the transverse plate of said locking member toward the right-side panel of said mounting frame.

5. The computer apparatus mounting structure as claimed in claim 1, wherein said transverse flange has at least one mounting hole, and the transverse plate of said locking member has at least one through hole respectively connected to the at least one mounting hole of said transverse flange with a respective screw.

6. The computer apparatus mounting structure as claimed in claim 1, wherein said computer apparatus is a 5¼" computer apparatus.

* * * * *